United States Patent [19]

Greven

[11] 4,162,642
[45] Jul. 31, 1979

[54] ECCENTRIC CUTTERS FOR LONGITUDINALLY SEVERING ELONGATED MATERIAL TO BE DRAWN

[75] Inventor: Johann Greven, Aachen, Fed. Rep. of Germany

[73] Assignee: SCHUMAG GmbH, Aachen, Fed. Rep. of Germany

[21] Appl. No.: 828,886

[22] Filed: Aug. 29, 1977

[30] Foreign Application Priority Data

Aug. 27, 1976 [DE] Fed. Rep. of Germany ....... 2638629

[51] Int. Cl.$^2$ ................................................ B25B 7/14
[52] U.S. Cl. ...................................... 83/328; 72/275; 72/332
[58] Field of Search ................... 72/275, 332, 184, 185, 72/186; 83/328; 140/140

[56] References Cited

U.S. PATENT DOCUMENTS

| | | | |
|---|---|---|---|
| 2,157,000 | 5/1939 | Morgan et al. | 83/328 |
| 3,398,616 | 8/1968 | Elineau | 83/328 |
| 3,869,948 | 3/1975 | Rau | 83/328 |
| 3,916,745 | 11/1975 | Strohmeier et al. | 83/328 |

FOREIGN PATENT DOCUMENTS

2422816  5/1974  Fed. Rep. of Germany ............. 72/275

*Primary Examiner*—Michael J. Keenan
*Attorney, Agent, or Firm*—Herbert L. Lerner

[57] ABSTRACT

A carriage drawing machine for uniformly drawing and cutting-to-length drawn elongated material and having a main drive shaft with means for driving a drawing machine carriage so as to advance the elongated material, a severing device and means for coupling the severing device to the main shaft each time the elongated material is to be severed, the severing device including two cutters disposed in a common plane and eccentrically coupled to the main drive shaft, the cutters being rotatable in opposite directions and in synchronism with the advance of the elongated material during the severing operation, means defining between the two cutters a travel path for the elongated material being advanced, each of the cutters including a ring, a knife extending radially outwardly from each ring toward the travel path between the cutters, and means cooperating with the cutters for adjustably controlling the knives to follow the drawn material and to orient the knives perpendicularly to the direction in which the material has been drawn, the control means being linked to each ring at a substantially diametrically opposite point thereof from the knives.

9 Claims, 3 Drawing Figures

ECCENTRIC CUTTERS FOR LONGITUDINALLY SEVERING ELONGATED MATERIAL TO BE DRAWN

The invention relates to a carriage drawing machine for uniformly drawing and cutting to-length drawn elongated material. The machine includes a main drive shaft with revolving cams for driving a carriage and a succeeding severing device which is couplable to the drive shaft and is advanceable each time the material is severed during the severing operation.

From German Patent DT-PS 593,437, such a machine has become known heretofore, the severing device therein being disposed on a separate carriage which is moved along with the drawn material during the severing operation. The cutting knives are mounted on the carriage and execute the severing operation while the carriage is moving. Such a carriage is an expensive structure because of the obvious complexities required. There is also the disadvantage that the considerable mass of the carriage must be accelerated for the cutting operation and then decelerated again within a short span of time. This requires large forces to move the carriage and correspondingly stable structural parts.

On the other hand, there are disadvantages to using a separate carriage. With a separate carriage the drawing process would have to be stopped for every cutting operation which would be highly inefficient. Another type of apparatus, the so-called eccentric cutters have become known to be advantageous, but in the known embodiments thereof, they require that the drawing process be stopped for the severing operation or that, for a continuous drawing process, a separate carriage also be used. It is an object of the invention to provide a carriage drawing machine for uniformly drawing and cutting to length drawn elongated material which avoids the foregoing disadvantages of the heretofore known devices of this general type and which provides eccentric cutters in such a manner that a separate carriage can be dispensed with, and the cutting can nevertheless be accomplished on moving drawn material, without interruption of the drawing process.

With the foregoing and other objects in view, there is provided, in accordance with the invention, a carriage drawing machine for uniformly drawing and cutting to-length drawn elongated material and having a main drive shaft with means for driving a drawing machine carriage so as to advance the elongated material, a severing device and means for coupling the severing device to the main shaft each time the elongated material is to be severed, the severing device comprising two cutters disposed in a common plane and eccentrically coupled to the main drive shaft, the cutters being rotatable in opposite directions and in synchronism with the advance of the elongated material during the severing operation, means defining between the two cutters a travel path for the elongated material being advanced, each of the cutters comprising a ring, a knife extending radially outwardly from each ring toward the travel path between the cutters, and means cooperating with the cutters for adjustably controlling the knives to follow the drawn material and to orient the knives perpendicularly to the direction in which the material has been drawn, the control means being linked to each ring at a substantially diametrically opposite point thereof from the knives.

The eccentrics, which are stationary, and the knives which are secured to the eccentric rings or hoops have a very small mass as compared to conventional separate carriages, only small forces being therefore required to accelerate and decelerate that small mass. This makes it possible to direct the strength of the structural parts mainly to the cutting forces, while acceleration and deceleration forces only slightly influence the construction and the dimensions. It has been determined by tests that, when the eccentrics revolve synchronously, each of the two knife edges traverse an oval curve which covers a range, wherein the synchronous following by the knife edges of the drawn material and the orientation of the front surfaces of the knives perpendicularly to the direction of drawing are provided during the severing operation. It has further been found by tests that it is possible to control the curves in such a manner that in the remaining regions thereof, the travel therethrough of the drawn material is not impeded.

In accordance with another feature of the invention, the control means is a rod pivotable at one end thereof to the ring at the location thereof at which the control means are linked to the respective ring, and being pivotable at the other end to a fixed point.

In accordance with a further feature of the invention, the eccentricity of the mounting of the cutters to the shafts, the location of the respective fixed points, and the length of the respective rods are adjustable. Through this adjustment or setting, the aforementioned curves of the knife edges can be adjusted so that the desired range is obtained wherein, on the one hand, the severing process occurs and, on the other hand, the knife edges synchronously follow with great accuracy the drawn material, and the front surfaces of the knives are oriented perpendicularly to the direction of drawing, as well. After an optimal adjustment has been effected once, this adjustment applies unchanged for different drawing velocities and severing lengths.

In accordance with an additional feature of the invention, spring means are provided for protecting the rods and the pivot points thereof against shock. The spring means should have only limited resiliency so that the knife alignment or orientation and the synchronous travel of the knives, when severing, are not adversely affected. However, since the severing forces are relatively large, excessive stresses of the structural elements during the severing operation are avoided by the shock protection.

In accordance with yet another feature of the invention, means for holding the knives are provided which firmly connect the knives to the rings respectively. Thus, the knives can be exchanged easily yet are reliably held by the eccentric rings or hoops.

In accordance with a still further feature of the invention, the coupling means include eccentrically mounted rotary shafts carrying the cutters, and means coupled to another shaft for rotating the cutters in opposite rotary directions at the same speed of rotation, an interposed transmission disposed on the other shaft for setting the speed of rotation of the eccentrically mounted shafts relative to the speed of rotation of the main drive shaft, and means for adjusting at least one of the angle of the rotating means and the eccentric mounting of the cutters.

The transmission means are advantageously two spur gears with an equal number of teeth mounted on the eccentric shafts. The gears are in continuous engagement and are accurately fixed on the eccentric shafts by keys. Thus, the relative position of the knife holders and knives is accurately maintained during each revolution. Furthermore, the correct direction of rotation of the eccentric shafts relative to each other is obtained automatically. The adjustment means for the angular adjustment of the transmission means and/or the eccentric disks contribute to the accurate determination of the hereinabovementioned curves described by the knife edges. By means of the interposed transmission, the different speeds of rotation are matched one to the other.

In accordance with another additional feature of the invention, continuously variable intermediate transmission means for slightly varying the rotary speed of the eccentric shafts are provided so as to have an effect upon the length tolerance of the severed lengths of the material. This has been found to be advantageous for obtaining as minimal a length tolerance as is possible. This has no noticeable adverse effect on the synchronization of the knife edges with the travel of the drawn material and the perpendicular position of the front surfaces of the knives during the severing operation, as was determined by the hereinaforementioned tests.

In accordance with yet another feature of the invention, a clutch is disposed before the interposed transmission for coupling one of the main drive shaft and the main drive transmission through the interposed transmission to the eccentric shafts. Such a clutch can be controlled or engaged by the front end of the length of the drawn material that is to be severed. By engaging and disengaging the clutch, bar lengths of up to several meters long can be cut. The lengths of material severed in this manner depend upon the speed of rotation of the eccentric shafts and the offset of the eccentric disks relative to the central axes of the eccentric shafts. For each revolution of the eccentric shafts, a severing operation is performed upon the advanced material. In this manner, very short bar lengths e.g. less than 200 mm long, can be cut off continuously. This is important in the manufacture of so-called commutator sections or profiles. These are trapezoidal sections or profiles, for which bar lengths of less than 200 mm generally are required. Heretofore, bars several meters long had to be subdivided in a separate production operation. With the carriage drawing machine according to the invention or the severing device associated therewith, commutator sections or profiles can be drawn and cut immediately to the short finished lengths of less than 200 mm. The curved path traveled by the knives intersects the material at an area in the path and then automatically leaves the intersection area and returns to make another cut after a revolution has been completed. Therefore, the length of severed pieces depends on the speed of revolution of the knife, the speed of travel of the carriage, and the size of the curved path.

In accordance with yet an additional feature of the invention, control means responsive to the lengths to be severed or to a switched-in time delay for selectively operating the clutch are provided.

In accordance with a concomitant feature of the invention, the interposed transmission is an angle transmission, and a univeral shaft is provided connecting the interposed transmission to the main drive transmission.

An advantageous spatial disposition is thereby afforded. In addition, a number of speeds are available in the main transmission, and it is possible for the interposed transmission to transmit directly a speed as favorable as possible, which simplifies the construction and operation of the interposed transmission.

One advantageous procedure is to adjust, in principle, the stepdown ratio of the interposed transmission and the offset of each eccentric disk relative to the central axis, depending upon the shortest required length. This shortest length is then obtained if the clutch is engaged continuously. Longer lengths are obtained if the clutch is temporarily disengaged, since the completion of the revolution of the path which the knife travels is interrupted.

Other features which are considered as characteristic for the invention are set forth in the appended claims.

Although the invention is illustrated and described herein as embodied in a carriage drawing machine for uniformly drawing and longitudinally severing drawn elongated material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
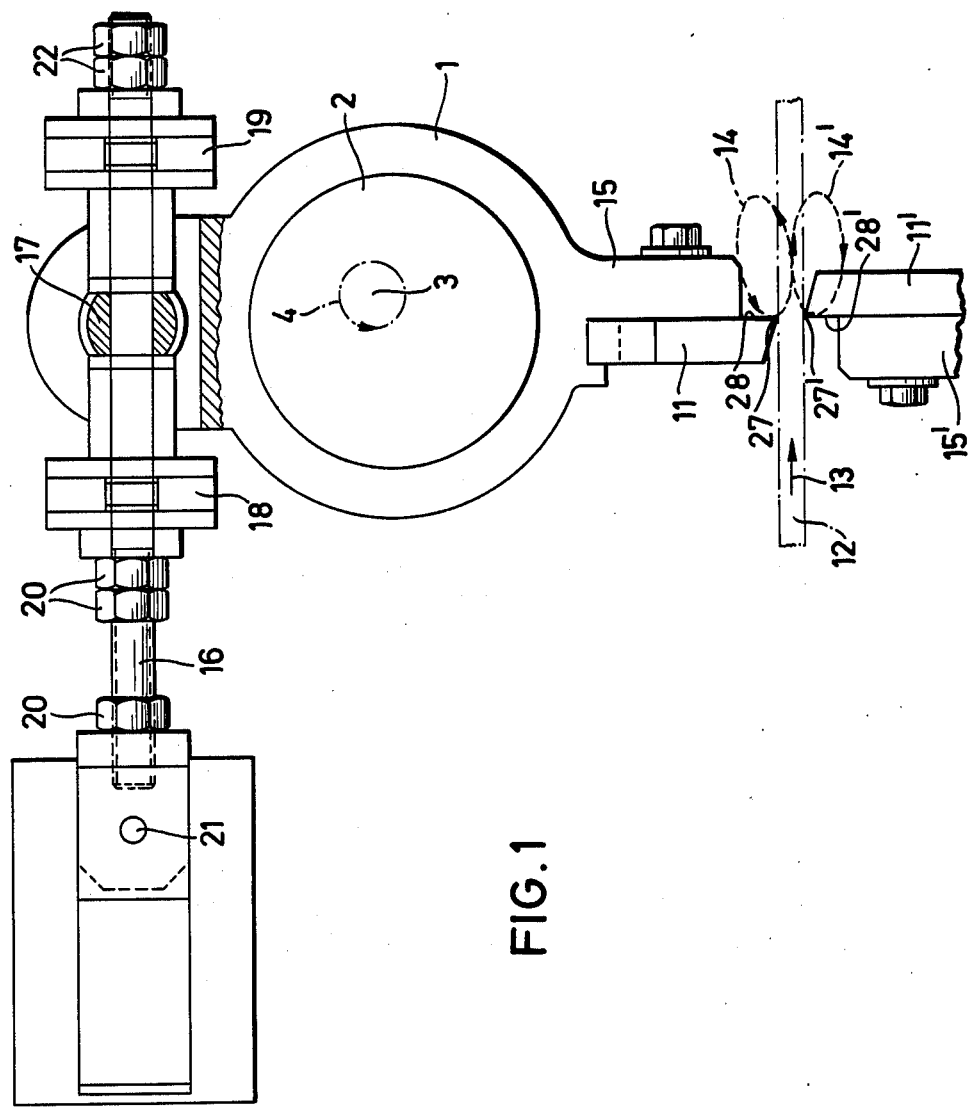
FIG. 1 is a diagrammatic front elevational view, partly in cross section, of the upper eccentric of a carriage drawing machine according to the invention.
Figures 2, 3:
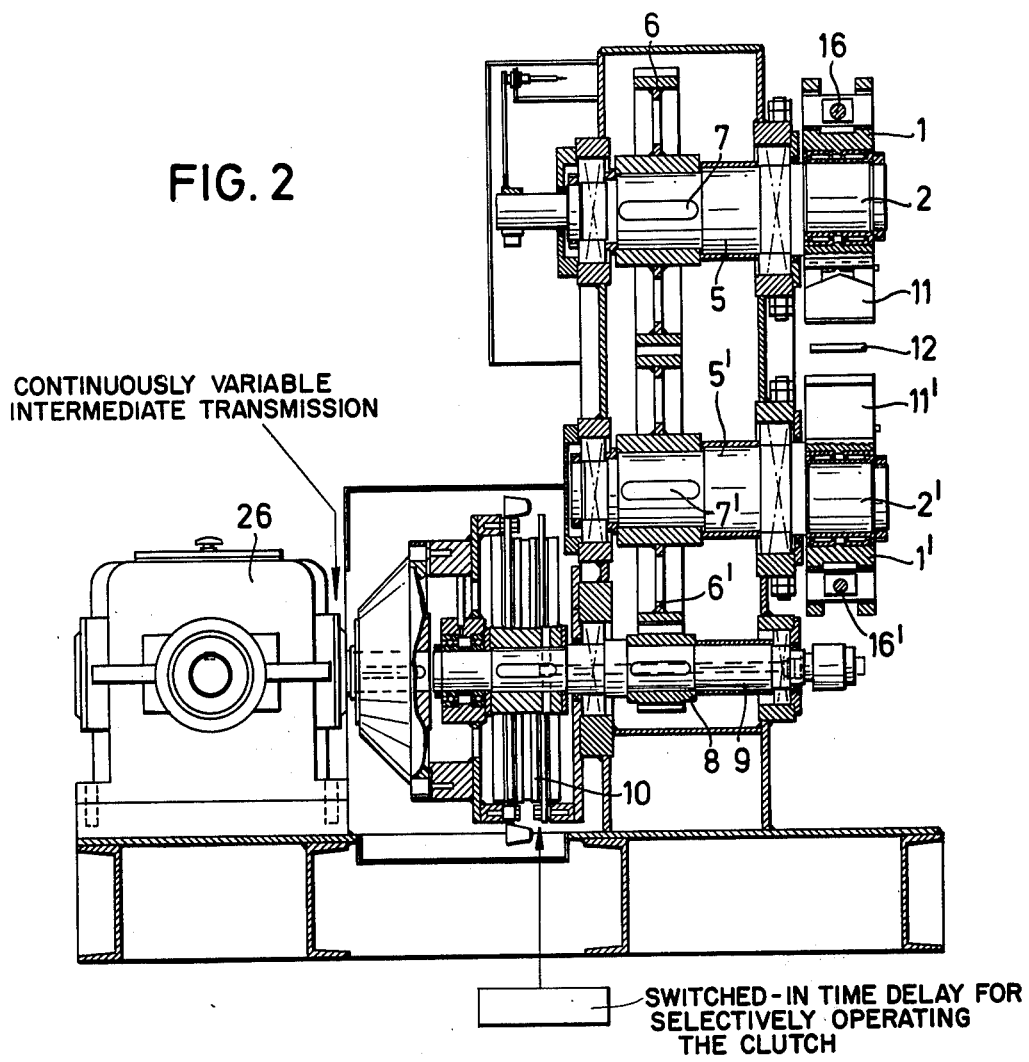
FIG. 2 is a reduced side elevational view, partly in section, of a greater part of the drawing machine than shown in FIG. 1, taken in the direction of the arrow II in FIG. 3.
FIG. 3 is a further reduced top plan view of a section of a complete drawing machine.

Referring now to the figures of the drawing, and first, particularly, to FIGS. 1 and 2 thereof, there is shown an eccentric disk 2 which can also be referred to as an eccentric journal 2. This also applies to the eccentric disk 2'. It is assumed that the eccentrics are disposed above one another. The eccentric disks 2 and 2' are rigidly mounted on eccentric shafts 5 and 5'. The eccentric disk 2 rotates about an axis 3 in direction of the arrow 4. This rotation occurs each time the drawn material is severed.

The rotation of the eccentric disks 2 and 2' imparts to eccentric rings or hoops 1 and 1', respectively, a special motion for effecting severing. In FIG. 1, an apparatus similar to that shown above the material 12 that is to be drawn should be imagined as being located below the material 12 to be drawn. Knives 11 and 11' are attached to knife holders 15 and 15' which are in turn attached to the eccentric hoops in rings 1 and 1'.

During the motion of the eccentric rings or hoops 1 and 1', the knife edges 27 and 27' describe the curves 14 and 14', respectively. The curves 14 and 14' can be adjusted so that they have a range wherein, on the one hand, the severing operation occurs and, on the other hand, with very great accuracy, the knife edges 27 and 27' synchronously follow the drawn material 12, which is advanced in the direction of the arrow 13.

The front surfaces 28 and 28' of the knifes 11 and 11' are oriented perpendicularly to the direction of drawing represented by the arrow 13 during the foregoing operation.

The eccentric ring or hoop 1 is pivoted at the point 17 to the rod 16, which in turn is pivoted at the fixed point 21, so that the eccentric hoop 1 can execute the desired movements. The same applies to the eccentric hoop 1'. As shown in FIG. 2, a rod 16' similar to the rod 16 is provided for the eccentric hoop 1'. The rod 16 has adjustment means, the lock units 20 and 22, and shock-protecting means, namely springs 18 and 19. The offset of the eccentric disk 2, the position of the fixed point 21 and the length of the rod 16 are all adjustable. All of the foregoing features are applicable, as well, to the eccentric disk 2' and the rod 16'. The adjustability features permit the curves 14 and 14' to have the hereinafore-mentioned desired shape.

The eccentric shafts 5 and 5' are coupled by suitable transmission means for revolution in opposite direction at the same speed of rotation. The transmission means are in the form of two spur gears 6 and 6' each having the same number of teeth and being mutually engaged continuously and precisely and accurately fixed by keys 7 and 7' on the eccentric shafts 5 and 5'. The spur gears 6 and 6' are driven by the pinion 8 mounted on the shaft 9. The shaft 9 receives the correct rotary speed from an interposed transmission 26, which is couplable to the shaft 9 by means of a clutch 10. To sever longer lengths, the clutch 10 can be actuated, for example, by the front end of the length to be cut off. The eccentric disks 2 and 2' then execute one revolution during which the drawn material 12 is cut off to the correct length. For severing shorter lengths, clutch 10 can be in engagement continuously, and the eccentric disks 2 and 2' can then rotate continuously and sever for each revolution one length of the drawn material 12.

A non-illustrated continuously variable intermediate transmission, which serves to influence the length tolerance of the severed length by slightly varying the rotary speed of the eccentric shafts 5 and 5' is advantageously associated with the interposed transmission 26.

The interposed transmission 26 is constructed as a miter gear and is connected to the main drive transmission 24 by means of the universal shaft 25. The main drive transmission 24 is driven by a motor 23 and, in turn, drives the main drive shaft 30, which maintains the cams for the drawing carriage drive in rotation. The drawing carriages effect uniform advance or feed of the drawn material 12, which, after passing roller straighteners 29, reaches the severing section as seen in FIG. 3.

The desired synchronism is thus produced between the advance or feed of the drawn material 12, and the respective rotation or revolution of the eccentric disks 2 and 2'.

The drawn material may be of circular-section material, or profiled material, such as strip material, especially, and also commutator material having a trapezoidal cross section.

I claim:

1. Eccentric cutters for severing continuously traveling elongated material comprising two eccentrics disposed in a common plane and eccentrically mounted in stationary bearing means, the eccentrics being rotatable in opposite directions and in synchronism with the travel of the elongated material during the severing operation, means defining between said two eccentrics, a travel path for the traveling elongated material, each of said eccentrics comprising a ring, a knife extending radially outwardly from each ring toward the other ring and toward said travel path between said eccentrics, and respective means cooperating with each of said rings for controlling orientation of said knives with respect to the elongated material for severing the elongated material, said control means being linked to each ring at a substantially diametrically opposite point thereof from said knives, said control means comprising a rod, said ring being pivotably connected to one end of said rod at a location of said ring at which said control means are linked to the respective ring and extending from said pivot location thereof substantially parallel to said travel path, said rod being pivotable at the other end thereof at a fixed point.

2. Eccentric cutters according to claim 1, wherein the eccentricity of the mounting of the eccentrics, the location of the respective fixed points, and the length of the respective rods are adjustable.

3. Eccentric cutters for severing continuously traveling elongated material comprising two eccentrics disposed in a common plane and eccentrically mounted in stationary bearing means, the eccentrics being rotatable in opposite directions and in synchronism with the travel of the elongated material during the severing operation, means defining between said two eccentrics, a travel path for the traveling elongated material, each of said eccentrics comprising a ring, a knife extending radially outwardly from each ring toward the other ring and toward said travel path between said eccentrics, respective means cooperating with each of said rings for controlling orientation of said knives with respect to the elongated material for severing the elongated material, said control means being linked to each ring at a substantially diametrically opposite point thereof from said knives, said control means comprising a rod, said ring being pivotably connected to one end of said rod at a location of said ring at which said control means are linked to the respective ring and extending from said pivot location thereof substantially parallel to said travel path, said rod being pivotable at the other end thereof at a fixed point and spring means for protecting the rods and the pivot points thereof against shock.

4. Eccentric cutters according to claim 1, including means firmly connected to the respective rings for holding the respective knives.

5. Eccentric severing device according to claim 1, wherein said stationary bearing means comprise rotary shafts carrying said eccentrics, and means coupled to another shaft for rotating said eccentrics in opposite rotary directions at the same speed of rotation, an interposed transmission disposed on said other shaft for adjusting the speed of rotation of the eccentric-carrying rotary shafts, and means for adjusting at least one of the angle of the rotating means and the eccentric mounting of the eccentrics.

6. Eccentric cutters for severing continuously traveling elongated material comprising two eccentrics disposed in a common plane and eccentrically mounted in stationary bearing means, the eccentrics being rotatable in opposite directions and in synchronism with the travel of the elongated material during the severing operation, means defining between said two eccentrics, a travel path for the traveling elongated material, each of said eccentrics comprising a ring, a knife extending radially outwardly from each ring toward the other ring and toward said travel path between said eccentrics, respective means cooperating with each of said rings for controlling orientation of said knives with respect to the elongated material for severing the elongated material, said control means being linked to each ring at a substantially diametrically opposite point thereof from said knives, said control means comprising a rod, said ring being pivotably connected to one end of said rod at a location of said ring at which said control means are linked to the respective ring and extending from said pivot location thereof substantially parallel to said travel path, said rod being pivotable at the other end thereof at a fixed point, said stationary bearing means comprise rotary shafts carrying said eccentrics, and means coupled to another shaft for rotating said eccentrics in opposite rotary directions at the same speed of rotation, an interposed transmission disposed on said other shaft for adjusting the speed of rotation of the eccentric-carrying rotary shafts, and means for adjusting at least one of the angle of rotating means and the eccentric mounting of the eccentrics, and continuously variable intermediate transmission means for slightly varying the rotary speed of the eccentric-carrying rotary shafts so as to have an effect upon the length tolerances of the severed lengths of the material.

7. Eccentric cutters according to claim 5, including a clutch disposed before said interposed transmission for coupling one of a main drive shaft and a main drive transmission through said interposed transmission to said eccentric-carrying rotary shafts.

8. Carriage drawing machine according to claim 7 including control means responsive to the lengths to be severed or to a switched-in time delay for selectively operating said clutch.

9. Carriage drawing machine according to claim 6, wherein said interposed transmission is an angle transmission, and including a universal shaft connecting said interposed transmission to a main drive transmission.

* * * * *